United States Patent [19]

Takada, deceased et al.

[11] 3,970,116
[45] July 20, 1976

[54] METHOD OF WEAVING A COMPOSITE TUBE AND WEB AND RESULTING ARTICLE

[76] Inventors: Takezo Takada, deceased, late of Hikone, Japan; by Juichiro Takada, legal authorized heir, 3-12-1, Shin, Setagaya, Tokyo, Japan, 154

[22] Filed: Jan. 31, 1975

[21] Appl. No.: 546,162

Related U.S. Application Data

[63] Continuation-in-part of Ser. No. 385,387, Aug. 3, 1973, abandoned.

[52] U.S. Cl. ............................. 139/387 R; 139/20
[51] Int. Cl.² .................... D03D 3/02; D03C 13/00
[58] Field of Search ............... 139/387 R, 388, 389, 139/390, 384 R, 20; 250/150 SB, 150 AB; 297/385

[56] References Cited
UNITED STATES PATENTS

| 115,859 | 6/1871 | Isherwood | 139/387 R |
| 505,949 | 10/1893 | Lyall | 139/387 R |
| 507,836 | 10/1893 | Orndorff | 139/390 |
| 1,065,020 | 6/1913 | Batchelder | 139/387 R |
| 1,537,912 | 5/1925 | Aumann | 139/387 R |
| 2,035,950 | 3/1936 | Dillingham et al. | 139/387 R |
| 2,222,150 | 11/1940 | Moore | 139/384 R |
| 3,314,719 | 4/1967 | Johnson | 297/385 |
| 3,682,498 | 8/1972 | Rutzki | 280/150 AB |
| 3,820,842 | 6/1974 | Stephenson | 280/150 AB |
| 3,830,519 | 8/1974 | Lewis | 280/150 AB |

FOREIGN PATENTS OR APPLICATIONS

| 569,747 | 11/1957 | Italy | 139/387 R |
| 400,122 | 11/1942 | Italy | 139/387 R |

*Primary Examiner*—James Kee Chi
*Attorney, Agent, or Firm*—Wolder & Gross

[57] ABSTRACT

A unitary woven composite tube and web includes a tubular section and an interwoven web section which may be formed as a tube, and which is useful for inflatable safety belts and other uses. The composite article is woven wherein the filling runs are successively interwoven with the longitudinal warps along an upper forward first run, a lower return second run below the first run, a third forward run extending to and interweaving the second run at a point intermediate its ends and a return fourth run and the cycle is repeated. Various warp filling weaves may be employed. The tubular section may house a longitudinally extending cable. The filling and warp may be interwoven in any desired pattern.

5 Claims, 7 Drawing Figures

METHOD OF WEAVING A COMPOSITE TUBE AND WEB AND RESULTING ARTICLE

CROSS REFERENCE TO OTHER APPLICATIONS

The present application is a Continuation-In-Part of co-pending Patent Application Ser. No. 385,387, filed Aug. 3, 1973 now abandoned.

BACKGROUND OF THE INVENTION

The present invention relates generally to improvements in weaving and it relates more particularly to an improved method for weaving a unitary tubular section joined to a web section and the improved product.

There are numerous applications where co-extensive joined tubes and webs or a plurality of tubes are employed or are highly useful and such tubes and webs are frequently advantageously woven. For example, there are many types of passive restraining protective systems, such as vehicle occupant restraining devices, which possess as a part there of an inflatable belt or section. The inflatable belt or section commonly communicates with a source of compressed air to expand such belt or section and automatically fully restrain the seat occupant. It is highly advantageous that the restraining web or belt and the inflatable section be joined along their length with the belt functioning in its usual manner whereas the expansion of the inflatable section will, with such expansion function to extensively restrain the occupant's body.

Another application in which joined co-extensive tubes are highly useful is in connection with rescue apparatus for the escape of persons from great heights such as in high buildings in the event of fire and where other avenues of escape are closed and which are inaccessible by the conventional rescue ladders. An escape tube and a support belt or support cable are suitable for this application and it would be highly advantageous that such support and tube be formed as a unit.

There are many drawbacks and disadvantages of the construction of the devices of the above nature and the method for their fabrication.

SUMMARY OF THE INVENTION

It is a principal object of the present invention to provide an improved weaving method and an improved product produced thereby.

Another object of the present invention is to provide an improved method of weaving a composite tube and web and the resulting improved product.

Still another object of the present invention is to provide an improved method of producing composite woven tubes and the resulting product.

A further object of the present invention is to provide a method and product of the above nature characterizd by their low cost, convenience, superiority and high versatility and adaptability.

The above and other objects of the present invention will become apparent from a reading of the following description taken in conjunction with the accompanying drawings which illustrate preferred embodiments thereof.

In a sense, the present invention contemplates the provision of an improved method of weaving a composite tube and web in which the web extends along the length of the tube in which warps forming the web and tube extend longitudinally along the lengths of the tube and web and the fillings interweave the warps and at least some of the fillings traverse a run from transversely of a part of the web and peripherally a part of the tube. The tube is tangent to the web along the medial longitudinal axis of the web, the longitudinal edges of the web may be joined to form a second tube. The tube may house a longitudinally extending support cable. The repeated weaving cycle in its preferred form includes four warp runs, a forward first run extending between its ends, a return second run below the first run, a forward third run extending to a medial section of the second run and then diverging therefrom and a fourth return run intercepting the third run at the medial section thereof. The half sections of the second and fourth runs which extend from the areas of the ends of the first run form with the first run and the associated warps, the tubular section and the remaining fillings and warps from the web.

The method described above is simple, efficient and versatile and the resulting product possesses highly desirable physical properties and is of great versatility.

DESCRIPTION OF THE PREFERRED EMBODIMENTS

Figure 1A:
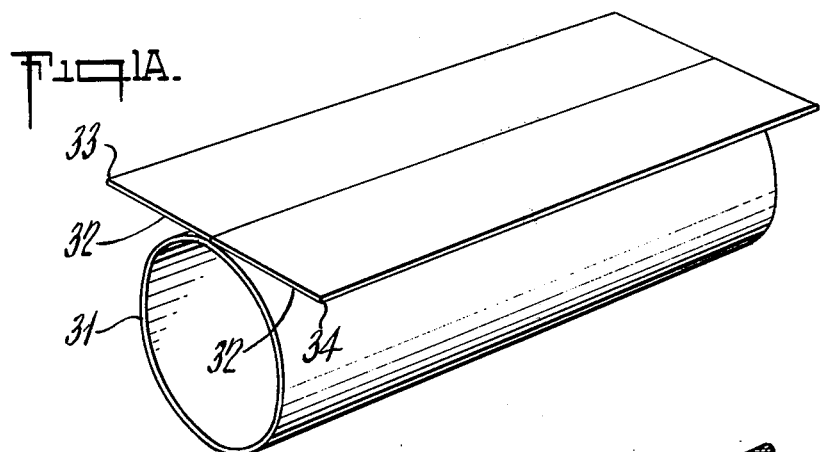
FIG. 1A is a perspective view of an improved composite tube and web woven in accordance with the present invention.
Figure 1B:
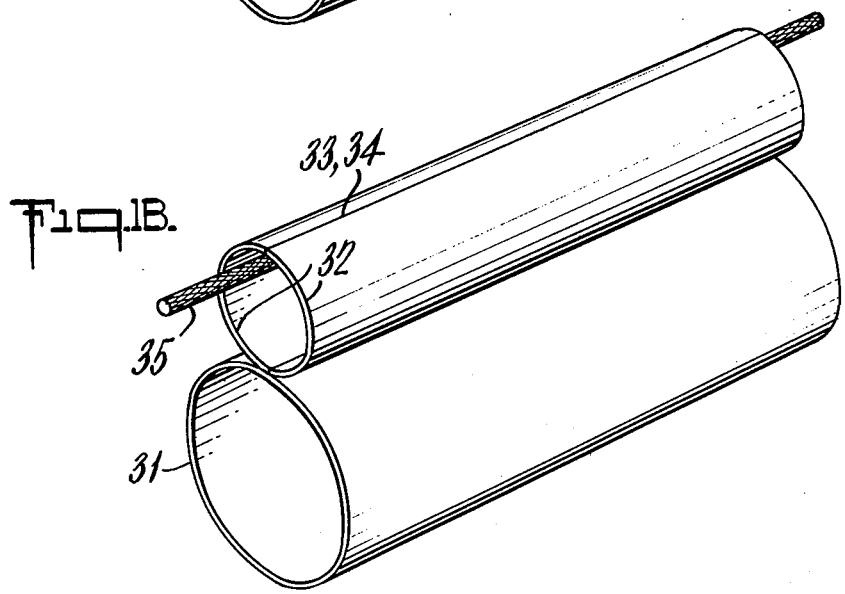
FIG. 1B is a perspective view of a modification thereof.

Referring now to the drawings and particularly FIGS. 1A and 1B thereof which show a preferred basic form of the improved product in its overall form and a modification thereof respectively, the production of which in accordance with the present invention will be hereinafter described, the reference numeral 31 generally designates a longitudinally extending woven tube section being formed and joined along the length thereof by the present weaving method by a web 32. The web 32 includes longitudinal side edges 33 and 34, and is woven with the weaving of tube 31 and joined along its medial axis thereto likewise by the improved weaving method.

The edges 33 and 34 of web 32 may be joined, such as by sewing, as illustrated in FIG. 1B to form a second tube through which extends a steel wire 35 or cable, or the like.

Figure 2:
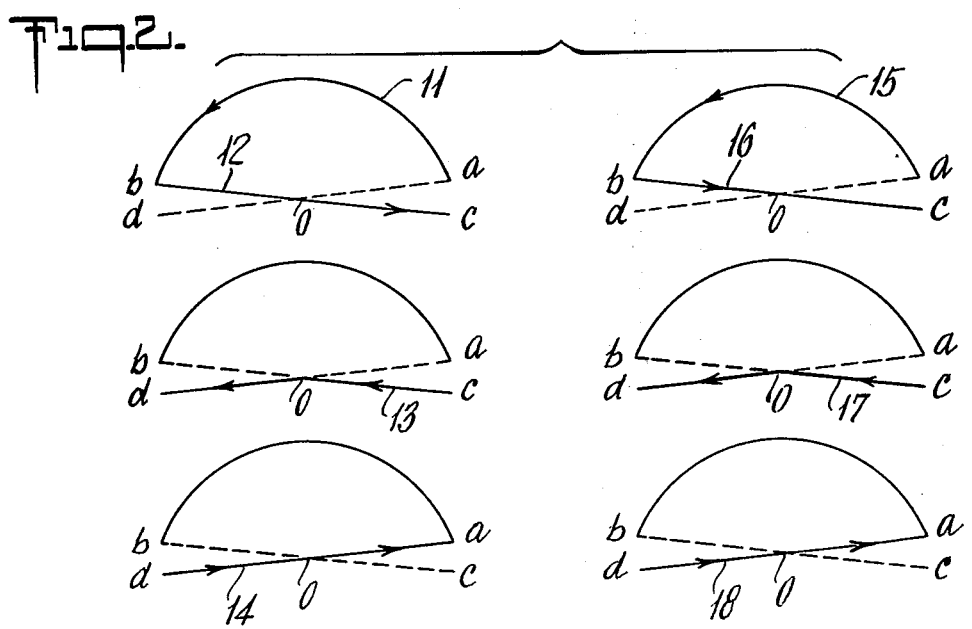
FIG. 2 is a set of diagrams illustrating successive warp runs in the weaving of the composite tube and web.
Figure 3:
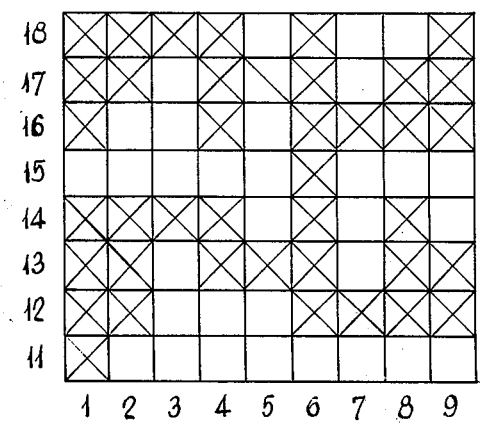
FIG. 3 is a textile weaving pattern of repetitive section.
Figure 4:
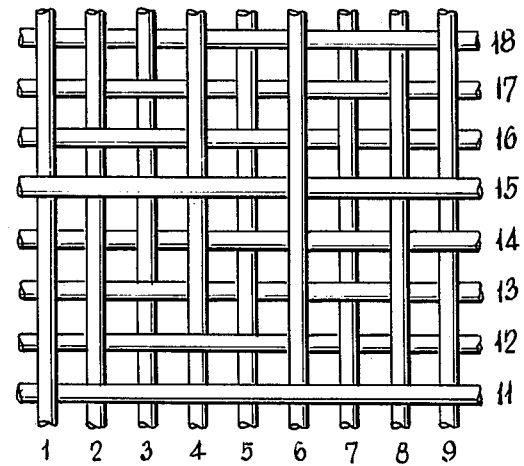
FIG. 4 is a top plan view of such section.
Figure 5:
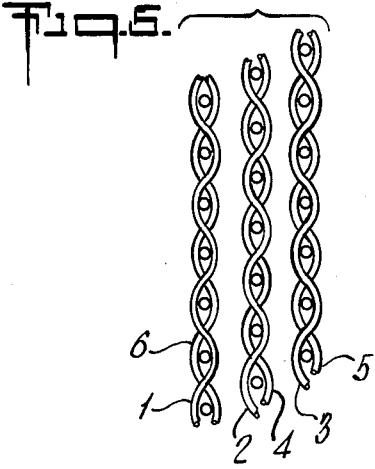
FIG. 5 is a transverse sectional view.
Figure 6:
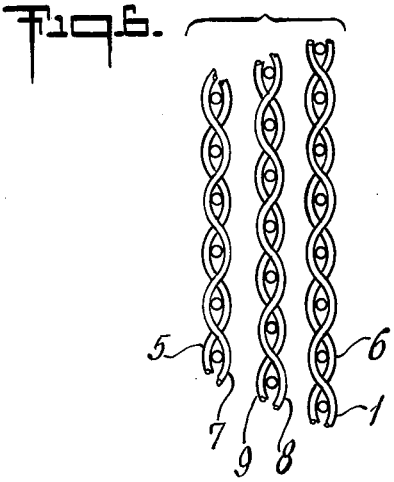
FIG. 6 is a transverse sectional view.

Considering now the weaving of the composite woven tube and web 31 and 32 as may be best understood by reference to FIG. 2 which illustrates the successive filling runs, the warps extending longitudinally perpendicular to the particular warp runs and relatively located in the planes of the filling runs to form therewith the joined tube and web weaving equipment which may be conventional and of known construction and operation is employed and is adjusted to be set up and programmed to effect weaving sequence and pattern shown illustrated in the drawings. The weaving cycle includes the following sequence and is successively repeated. The first forward filling run 11 is woven along a linear run, illustrated for clarity as being upwardly convex from right point *a* to left point *b* as shown by the arrow and this is followed by a return second filling run 12, also along a straight or linear path below first run 11 toward the right as shown by the arrow from point *b* to point *c*, passing through a medial axis or point *o* approximately intermediate points *b* and *c*, it being noted that the length *oc* may be equal to or longer or shorter than the length *bo*. Thereafter, the third forward filling run 13 is woven from point *c* leftward through point *o* thence onward to point *d*. The length *co* should be equal to the length *do* and the part *do* should be woven without overlapping or being interwoven with the part *bo*. The lengths of *co* and *do* may be selected without any restriction, except as dictated by the use and desired dimensions and configuration of the end product. The return filling run 14 traverses and is woven to the right as shown by the arrow from point *d* through point *o* to point *a*. It is to be noted that *oa* is equal in length to *ob*. The four filling run cycle is repeated by another similar cycle of four filler runs 15 to 18 as shown, the light filling runs 11 to 18 being interwoven in a unit repeated pattern with longitudinal warps 1 to 9 as shown in FIGS. 3, 4, 5 and 6 which illustrate respectively the design diagram and the plan and cross-sectional view of the weave of the preferred embodiment. It should be noted that the product can be woven to any desired dimensions and other weaves, such as a plain weave, twill weave or satin weave may be employed.

The composite tube and web or belt woven in the above manner, when in an extended condition is highly suitable for receiving and carrying fluids and solids and is advantageously so applied by reasons of the tube 31 being suspended and reinforced as a unitary structure with the belt 32. The composite structure is sufficiently strong to easily withstand considerable pressure and weight and the provision of the belt 32 as a unit with tube 31 adapts the structure to many uses and conditions.

Among the uses of the improved composite structure is as a combined safety belt and inflatable section in a vehicle occupant restraining system, the belt 32 being employed in the usual manner and the tube 31 defining the inflatable section being suitably sealed and connected to a suitable source of compressed air. The composite woven article may also be employed as an escape tube for use in descent from high stories in a building in the event of fire. In the latter case, the belt 32 may be reinforcd and supported along its edges 33 and 34 by steel wire or cables. As an alternative, the web edges 33 and 34 may be joined by sewing to form a small tube as shown in FIG. 1B and a steel wire or cable 35 housed therein to support the main tube 31.

While there have been described and illustrated preferred embodiments of the present invention, it is apparent that numerous alterations, omissions and additions may be formed without departing from the spirit thereof.

What is claimed is:

1. The method of producing a composite woven tube and web article in which the tube and web include longitudinally extending warps and are sustantially tangent to each other along a longitudinal axis parallel to said warps and spaced from and between the edges of the web comprising interweaving warps extending along said tube and said web with successive filling runs at least some of which are individually interwoven with warps both in the tube and web and extend along a portion of the periphery of said tube and between said longitudinal axis and an edge of said web and some of said filling runs extend for their full lengths only across the full width of said web and some of said filling runs extend for their full lengths only across the upper part of said tube.

2. The method of claim 1 wherein said filling runs include the sequence of a forward first run extending only along an upper part of said tube, a return second run extending along said web and a lower part of said tube, a forward third run extending entirely only along said web to an intermediate point of the second run and then away from said intermediate point and a return fourth run intercepting said intermediate point and extending to the start of said first run.

3. The method of claim 1 including the step of joining the longitudinal edges of said web to form a second tube.

4. A composite woven article including a longitudinally extending woven tube including longitudinal warps and peripheral fillings and a longitudinally extending woven web extending along the length of said tube and tangent thereto along a longitudinal axis of said web between the edges thereof and including longitudinally extending warps and transversely extending fillings interweaving said warps of said web, some of said web filling runs extending also along a lower adjacent portion of said tube and some of said filling runs extending for their full lengths only for the full width of said web.

5. The article of claim 4 wherein some of said filling runs extend only along the upper periphery of said tube.

* * * * *